US007275042B1

(12) United States Patent
Kelly et al.

(10) Patent No.: US 7,275,042 B1
(45) Date of Patent: Sep. 25, 2007

(54) SYSTEM AND METHOD OF PROVIDING AGRICULTURAL PESTICIDE INFORMATION

(75) Inventors: J. Keith Kelly, Newborn, GA (US); Peter Stuart Edmondson, Alpharetta, GA (US)

(73) Assignee: Kelly Registration Systems, Inc., Covington, GA (US)

( * ) Notice: Subject to any disclaimer, the term of this patent is extended or adjusted under 35 U.S.C. 154(b) by 1127 days.

(21) Appl. No.: 09/662,492

(22) Filed: Sep. 15, 2000

(51) Int. Cl.
*G06Q 30/00* (2006.01)
(52) U.S. Cl. .............................. 705/26; 705/27; 705/1
(58) Field of Classification Search .................. 705/25, 705/26, 27, 9
See application file for complete search history.

(56) References Cited

U.S. PATENT DOCUMENTS 7,162,438 B1 * 1/2007 Kelly et al. ................... 705/26
7,167,834 B1 * 1/2007 Kelly et al. ................... 705/26

FOREIGN PATENT DOCUMENTS

JP           2001290901 A  *  4/2000

OTHER PUBLICATIONS http://www.koppert.nl, http://web.archive.org/web/*/www.koppert.nl, Feb. 29, 2000.*
http://www.adgen.co.uk, http://web.archive.org/web/*/www.adgen.co.uk, Mar. 4, 2000.*
http://www.valent.com, http://web.archive.org/*web/*/http://valent.com, Mar. 2, 2000.*
http://www.doyourownpestcontrol.com, http://web.archive.org/*web/*/www.doyourownpestcontrol.com, Apr. 7, 2000.*
http://cppress.com, http://web.archive.org/web/*/www.cppress.com, Mar. 1, 2000.*
http://cppress.com, http://web.archive.org/web/*/www.cppress.com, Mar. 1, 2000.*

* cited by examiner

*Primary Examiner*—Matthew S. Gart
(74) *Attorney, Agent, or Firm*—McKenna Long & Aldridge LLP

(57) ABSTRACT

A method and system for supplying agricultural pesticide information and advice combines information regarding a particular pest, and the plant or crop which a user desires to protect from that pest, and generates information regarding which pesticides are suitable for that purpose. The method and system also allow verification of licensing requirements for sales of regulated agricultural products, such as certain pesticide products.

17 Claims, 7 Drawing Sheets

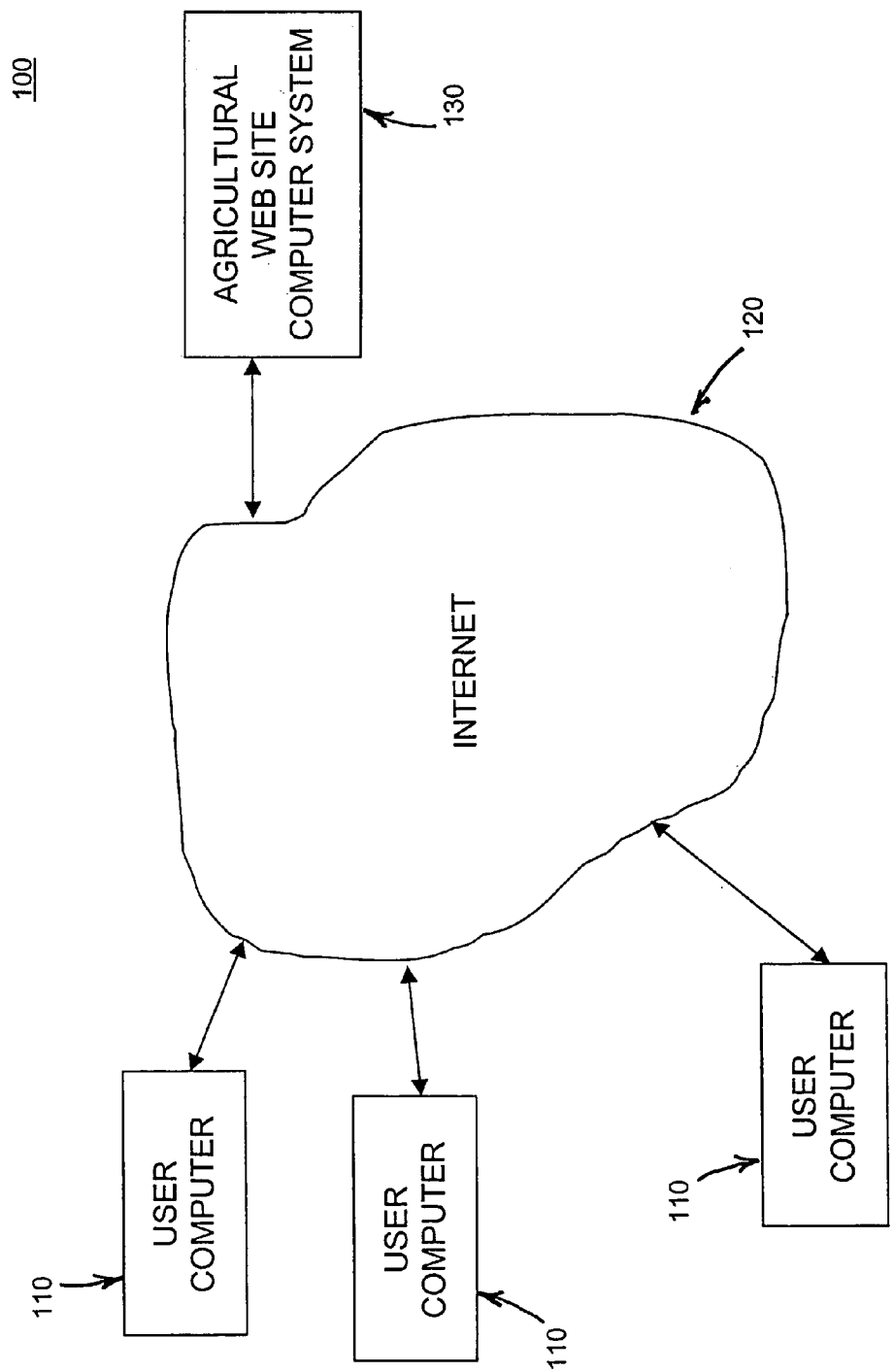

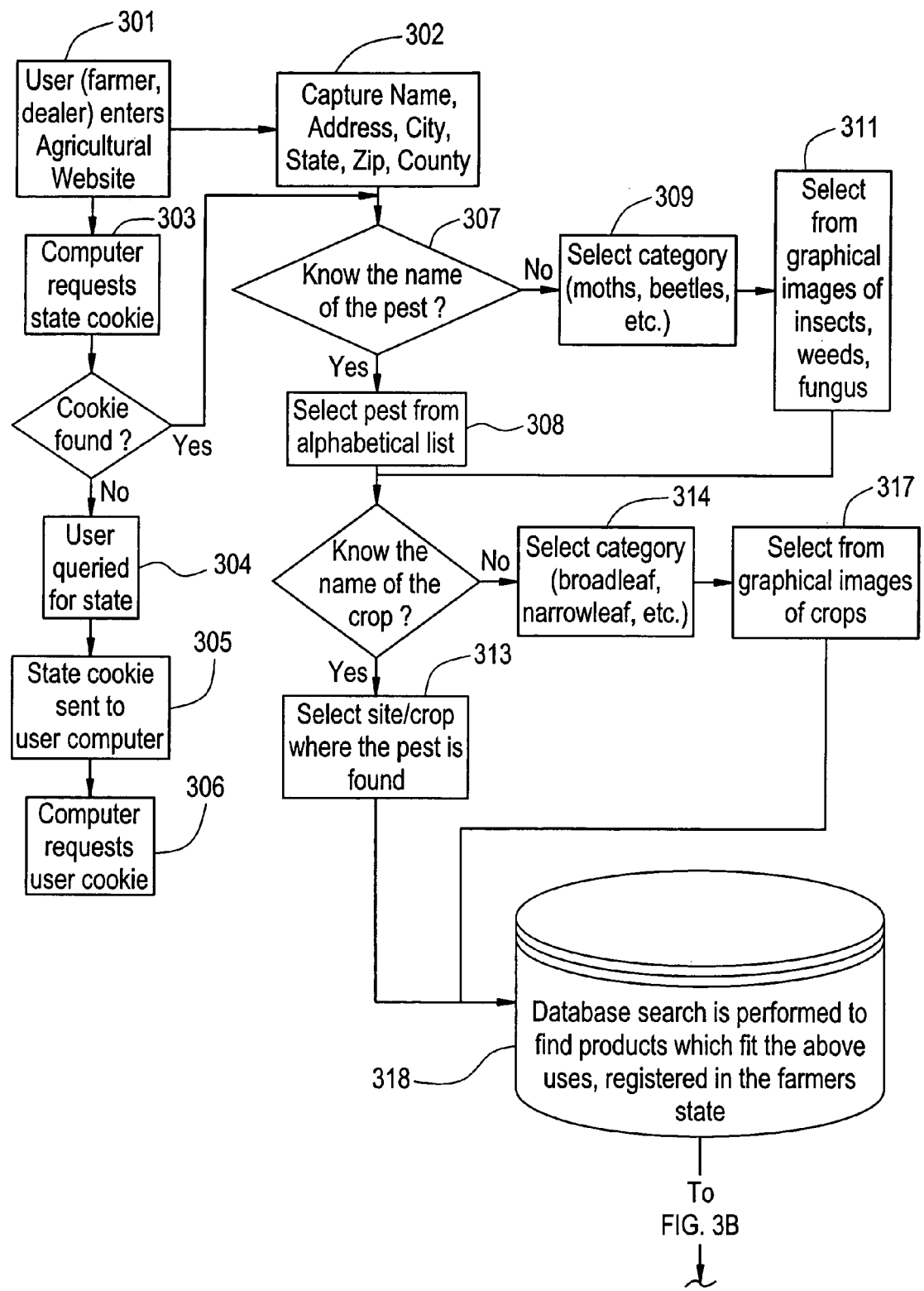

SYSTEM AND METHOD OF PROVIDING AGRICULTURAL PESTICIDE INFORMATION

BACKGROUND OF THE INVENTION

1) Field of the Invention

The present invention relates generally to the field of agriculture and more particularly to a method and system for providing agricultural pesticide information and advice, and for facilitating the purchase of pesticide products.

2) Description of the Related Art

As used herein, the term "agricultural products" is understood to refer generally to pesticide products and fertilizers, including specifically but without limitation, regulated pesticide and fertilizer products.

Though often misunderstood to refer only to insecticides, the term "pesticide" also applies to herbicides, fungicides, and various other substances used to control pests. As broadly used herein, pests include insects, mice and other animals, unwanted plants (weeds), fungi, or microorganisms like bacteria and viruses. Pesticides are useful to society because of their ability to kill potential disease-causing organisms, control insects, weeds, and other pests. At the same time, by their very nature, most pesticides create some risk of harm to humans, animals, or the environment because they are designed to kill or adversely affect living organisms.

Accordingly, in many countries, the sale and/or use of pesticides is regulated by various government agencies.

Within the United States, the Environmental Protection Agency (EPA) provides a federal or national level of regulation of pesticide products. The EPA defines a pesticide as any substance or mixture of substances intended for preventing, destroying, repelling or mitigating any pest. Under United States law, a pesticide is also any substance or mixture of substances intended for use as a plant regulator, defoliant, or desiccant. Drugs used to control diseases of humans or animals (such as livestock and pets) are not legally considered pesticides. Fertilizers, nutrients, and other substances used to promote plant survival and health are not considered plant growth regulators and thus are not pesticides.

The EPA regulates pesticides by developing and implementing policies which require testing to assess pesticide safety, as well as requiring registration and proper labeling of pesticides. The EPA further maintains a database of federally registered pesticide products and assigns an EPA identification code (EPA ID) to each federally registered pesticide product. For each federally registered pesticide product, the EPA database includes the EPA ID, pesticide type (e.g., herbicide, fungicide, insecticide, disinfectant, etc.), and a list of active ingredients in the pesticide product.

Also, for certain restricted use pesticide (RUP) products, the federal government requires each state to license all dealers and applicators. RUP products may not be legally sold to or used by individuals who are not licensed. Similarly, RUP products may only be sold within a state by a dealer which has been licensed in the state. Generally, these RUP products include pesticides intended for widespread agricultural or industrial use and which may, if used improperly, present a serious threat to public health and/or the environment.

The states, on a state-by-state basis, provide a second level of regulation of pesticides by requiring approval for the sales and use of pesticides. Different states have their own procedures for approval and registration of pesticide products. Also, various states require all dealers and applicators of certain state restricted use pesticide (S-RUP) products and state limited use products (SLUP) to be licensed. Generally, these S-RUP and SLUP products include pesticides intended to address a specific crop or problem in a specific area and which may, if used improperly, present a serious threat to public health and/or the environment. SLUP are products which may be sold like general use products if the individual container size is less than 32 oz's, however if the container is larger than that, then it is to be treated like a state restricted use product (S-RUP).

Such products may not be legally sold to or used by unlicenced individuals within these states. Moreover, some state's laws specify that such products may not be "offered for sale" to or by unlicenced persons, which means a license validation process has to take place before the buyer is shown a list of products.

There are several problems in the current processes used by farmers and other pesticide users for selecting pesticide products for use on their property and crops, and then for purchasing the selected pesticide products. Some of these problems also extend to the process of selecting and purchasing fertilizer products.

For one thing, it is difficult if not impossible for a farmer to optimize the selection and application of pesticide products to his/her crops in a way to maximize revenues. A variety of factors come into play, including the pest to be controlled, the price of the pesticide, the amount of pesticide to be applied per acre, the expected crop yields with and without pesticide application, the market price for the crops, etc. Moreover, many of these factors are dynamic in nature, changing from time to time.

Also, it is desirable for farmers and other agricultural pesticide applicators to be able to purchase pesticide products via the Internet. As noted above, the various states each separately regulate pesticide products sold and used within their borders. In the case of RUP, S-RUP, and SLUP products, the states also restrict the sale and use of these products so that they may only be sold to or used by licensed individuals. However, there is currently no efficient method for an Internet pesticide retailer to check whether a pesticide product is licensed for use within a jurisdiction (e.g., a state), or whether a prospective purchaser is licensed to purchase and use a RUP product in the state or other geographical region or jurisdiction where the product is being purchased. Also, in the case of an Internet auction site, there is no efficient method to validate a seller as licensed to deal in the state where a product is being sold. Thus, RUP products are being sold over the Internet to unlicenced individuals, creating a serious risk of harm to the public and/or the environment and in violation of state law.

SUMMARY OF THE INVENTION

It is an object of the present invention to provide a method and system for providing agricultural pesticide information and advice, and/or for facilitating the purchase of pesticide products.

According to one aspect, a method of providing agricultural pesticide information, includes inputting into a computer the identity of a pest existing on a property and the identity of a plant or crop existing on the property, wherein the plant or crop is adversely affected by the pest, and executing an algorithm for generating therefrom instructions for choosing a pesticide to protect the plant or crop from the pest.

Preferably, the instructions allow for a comparison of prices, application rates, etc. for different pesticides and may provide access to one or more of the following: a product label, a material safety data sheet, a worker protection statement, and a list of retailers or information on research studies.

Most preferably, the method includes obtaining the chosen pesticide by sale on-line, i.e., via the Internet. In this case, an algorithm initiates an analysis of restrictions on the sale of the pesticide, including validating information (e.g., licensing information) regarding a pesticide applicator or a pesticide dealer. Preferably, any on-line sale of the pesticide is then entered into a central database.

In another aspect, a computerized method of providing farm planning information assists a user in maximizing revenue for an agricultural property. The method includes receiving data on product prices, yields, land costs, and other relevant variables, and determining therefrom a recommended pesticide, seed, and/or fertilizer product to maximize net revenues for the user.

In yet another aspect, a system for providing agricultural pesticide information includes: memory for storing a plant database, a pest database, and a pesticide database; and a processor connected to the memory and being configured to generate instructions regarding which pesticides in the pesticide database can be used to protect a plant in the plant database from a pest in the pest database.

Preferably, the pesticide database contains information regarding restrictions on pesticides, and may contain a database of licensed applicators and/or dealers for the restricted pesticides. The memory may further store a central database of sales of pesticides according to geographic areas.

Also, preferably, the memory further stores a farm planning guide database, which includes a seed database and/or a fertilizer database.

In still another aspect, the processor and memory execute instructions of an algorithm which provides information to assist a user in optimizing crop yield, including providing information regarding seeds and fertilizers. The guide allows the user to enter data on prices, yields at various application rates, land costs, etc. and determines an optimal pesticide, seed, or fertilizer product to maximize net revenues for the user.

Other objects and advantages will become apparent to those skilled in the art from a review of the ensuing description which proceeds with reference to the following illustrative drawings.

BRIEF DESCRIPTION OF THE DRAWINGS

FIG. 1 is a block diagram of a computer network for illustrating one or more aspects of the present invention;

FIGS. 3A and 3B illustrate a first portion of a flowchart of a first preferred embodiment of a method and system for supplying agricultural pesticide information and/or advice;

DESCRIPTION OF THE PREFERRED EMBODIMENTS

Figure 2A:
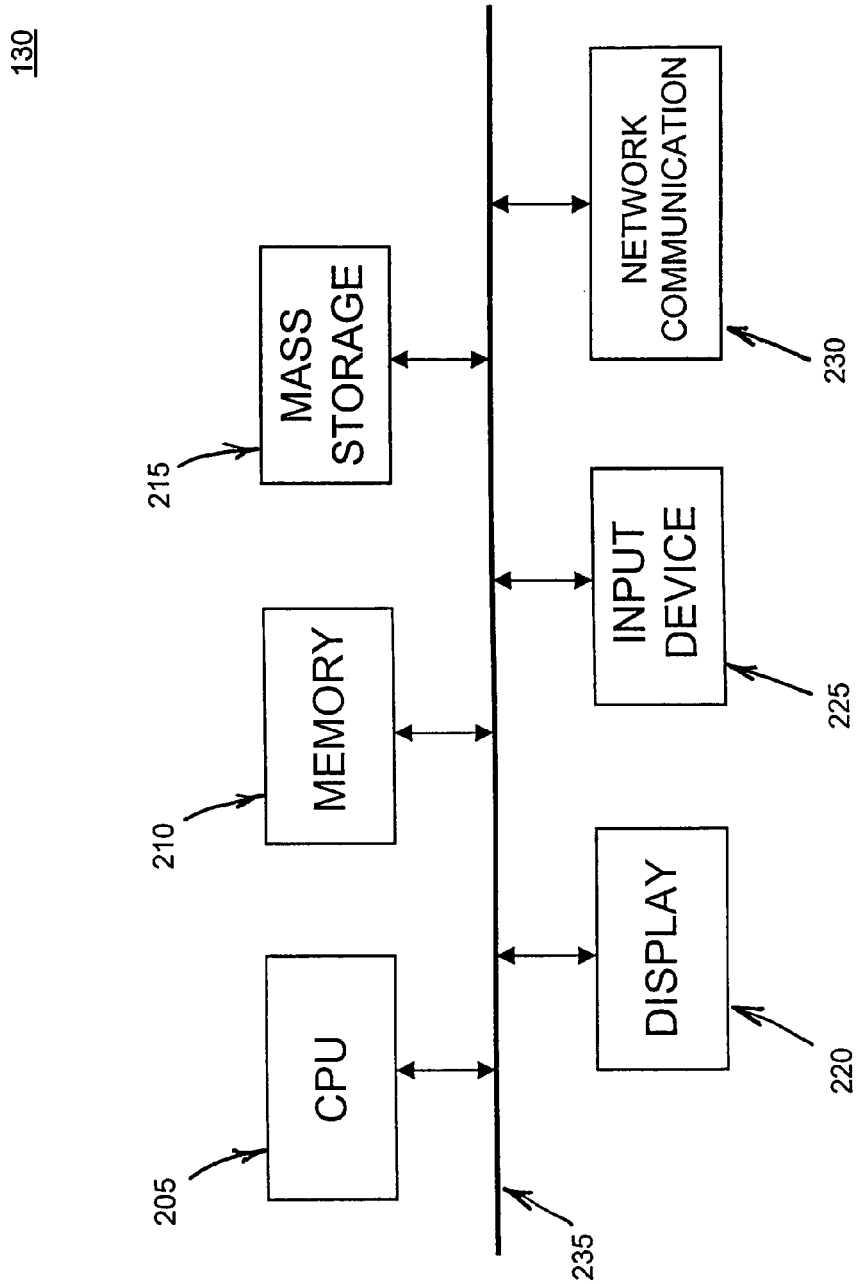
FIG. 2A is a block diagram of an agricultural Web site computer system.

As used herein, the term "plant" is understood to broadly describe a variety of forms of plant life, including plants, trees, shrubs, grasses, vines, flowers, fruit, vegetables, and the like.

The term "pest(s)" as used herein is understood to include insects, mice and other animals, unwanted plants (weeds), fungi, or microorganisms like bacteria and viruses. A "pesticide" is understood to include insecticides, herbicides, fungicides, and other substances used to control pests.

In a process described herein, a user, such as a farmer, identifies the pest(s) which he/she desires to control. If the name of the pest is not known, the user may choose from certain categories of pests, such as moths, beetles, etc., and may then select from graphical images of specific pests, such as insects, weeds and fungi.

After a specific pest is selected from an alphabetical list, the user must also identify the specific crop(s) which the pest(s) affect. Again, if the name of the crop is not known, the user may select from a broad category such as broadleaf, narrow-leaf, etc., and then may select a specific crop from a number of graphical images. The user also identifies a geographical region, including, preferably, a country, state or province, and county where the property is located. In a preferred embodiment, for example, where the property is located in the United States, the state where the property is located is determined. In some cases, a state or county grid map may be used to indicate the property's location. Based on the information supplied by the user, the user receives a list of recommended pesticides to control the particular pest(s) on the particular crop(s). Information about the various pesticides, such as the product label, material safety data sheet (MSDS), the worker protection statement(s) (WPS), a list of retailers and/or research studies may be provided to the user. Also, the user may be able to print the WPS posting sheet.

Preferably, the pesticide information includes not only which pesticide(s) are recommended for use, but also a recommended schedule of times or time windows during which the pesticide(s) should best be applied to the various types of plant life or crops on the user's property, and preferably, also application rates. Also, reminders may be provided to the user within a few days or a week of when a pesticide should be applied.

Further, if a user so chooses, the recommended pesticide(s) may be automatically sent to the user at the appropriate times and an account (e.g., credit card) of the user may be automatically debited accordingly. Prior to such purchase, it must be determined whether there are restrictions on the sale and/or use of the pesticide. If there are restrictions, information regarding the applicator (buyer) and dealer (seller or retailer), such as the state, the name, the license number and expiration date thereof, and perhaps a permit number, must be collected and validated against appropriate state database(s) in real time.

If the pesticide is successfully sold to the user, that sale may be entered into a database, preferably reporting some or all of the following information: the name and EPA ID for the product sold, the date, the amount sold, the state, zip code and county of the destination as well as the information regarding the applicator and the dealer. In this way, data relating to the use of various pesticides in different geographical regions can be tracked, in particular for centralized electronic record-keeping and reporting purposes—to states for tax collection, and to dealers for tax reporting.

In addition to the foregoing steps, the user may request additional information from the system. In particular, the user may access an "agricultural farm planning guide" which provides other advice and information on related gardening/agricultural products such as seeds, fertilizer and the like.

The method and system for supplying agricultural pesticide information and advice is automated by a computer. The computer compares an inventory of plant and pest life on the user's property with stored maintenance data for each plant as well as data for combating the various pests, and generates therefrom suggestions for pesticides which can be used on the property. The suggestions preferably include a schedule and recommended products to be applied. The computer-executed algorithms are flexible and adaptable, and may take into consideration a host of additional factors (crop inputs), such as the property's location, pets and livestock present on the property, the maintenance history of the property, weather forecasts, crop price forecasts, gasoline prices, land rental costs, etc. Preferably, the pesticide information is automatically updated as new information becomes available.

The method and system described herein assists the user in identifying the plant life on his property, together with pests or other problems which exist on the property, based on the user's response to a series of queries. In particular, the system and method may specifically be applied to allow a farmer to inventory crops growing upon his land, and to advise the farmer what fertilizers, pesticides, and other agricultural products to apply to his land, and a schedule for applying these materials, to optimize the farm's output.

Preferably, the method and system for supplying automated agricultural pesticide information and advice is provided via the Internet, such that it may be accessed ubiquitously by a user from any place with Internet access.

The present invention will be discussed with reference to preferred embodiments of a method in the form of a computer program. Numerous specific details, such as specific user queries, the order of the queries, etc. are set forth in order to provide a thorough understanding of the present invention. The preferred embodiments described herein are for the purposes of illustration only and should not be understood to limit the invention.

The embodiment(s) will be discussed with reference to flowcharts. The flowcharts make numerous mentions of querying a user for information. This act may be performed in a number of different ways. For example, in a preferred embodiment, the methods and systems described herein are practiced via an Internet site. In such an embodiment, the act of querying is performed by presenting a user with a number of choices that the user may "click" on to indicate a response. Such choices may be presented textually, such as by providing a number of hypertext links that move the user to a different portion of a hypertext document or different documents; or graphically.

Many other embodiments are also contemplated. Such embodiments include "standalone" computer software programs or point-of-sale displays which may provide for simple textual interaction (such as an embodiment in which the display consists of a simple alphanumeric device and a user responds with a numerical keypad to a series of textual inquiries) or more complex World-Wide-Web-like interaction. Embodiments such as point-of-sale embodiments may not have some of the features included in preferred embodiments discussed herein, such as presenting a user with a list of retail outlets where the product may be purchased (although a list of store locations may be presented).

The preferred embodiments are discussed with respect to the operations of a state government agency in the United States. In other countries, the methods and systems described herein for managing agricultural product information, and for facilitating the controlled sale, distribution, and use of agricultural products may be operated by different governmental bodies (provinces; municipalities; etc.) and government agencies, as the laws in those countries dictate. Accordingly, the broad applicability and scope of the invention should not be limited to the existing governmental regulatory framework in the United States.

Also, the preferred embodiments described herein pertain specifically to a user in the field of agriculture, such as a farmer. However, it is to be understood that in an alternative embodiment, the method and system may be configured to produce general gardening advice to professional horticulturists, and professional nurseries, and other pertinent categories of individuals.

A preferred embodiment of a computer network 100 which may be used to provide agricultural pesticide information and advice, and for facilitating the purchase of pesticide products according to one or more aspects of the present invention is shown in FIG. 1. The computer network 100 includes a plurality of user computers 110 connected by the Internet 120 with an agricultural Web site computer system 130.

A user computer 110 preferably includes a central processing unit (CPU), memory, a communication device such as a modem, and data input/output device(s), such as a display monitor, a keyboard/keypad, a mouse, a speaker, etc. The user computer 110 may operate and be connected in a separate computer network, such as a corporate intranet. The user computer 110 may be a standalone multipurpose computer, such as a MACINTOSH™ or WINDOWS™ based personal computer (PC), but it may take a variety of other forms as well. For example, the user computer 110 may be an Internet appliance, a television-based Internet access system, a cellular telephone, a personal digital assistant, or any other suitable intelligent peripheral which may allow a user to access information via a computer network.

FIG. 2A is a block diagram of an agricultural Web site computer system 130. In a preferred embodiment, the agricultural Web site computer system 130 includes at least one CPU 205 having associated therewith memory 210 and a mass data storage device 215, and optionally a display device 220, a data input device 225 (e.g., keyboard; mouse), and a network connection device 230, all connected to each other via a communication bus 235. The data storage device 215 includes nonvolatile data storage means, such magnetic disk drive units, optical disk drive units, removable disk drive units, tape media, or any combination thereof. The network connection device 230 includes hardware and software for establishing a data link connection between the agricultural Web site computer system 130 and user computer 110 via the Internet 120. Preferably, the interconnection circuitry 120 is the Internet and the network connection device 230 includes circuitry to tie directly to the Internet via T1, T4 or similar high bandwidth data lines as would be understood by one skilled in the art.

The agricultural Web site computer system 130 may include two or more integrated computer units, each having a separate CPU 205 having associated therewith memory 210 and/or a mass data storage device 215, and optionally a display device 220 and a data input device (e.g., keyboard; mouse) 225. The communication bus 235 may include two or more internal buses for integrated computer units, together with an external bus connecting two or more integrated computer units.

Figure 2B:
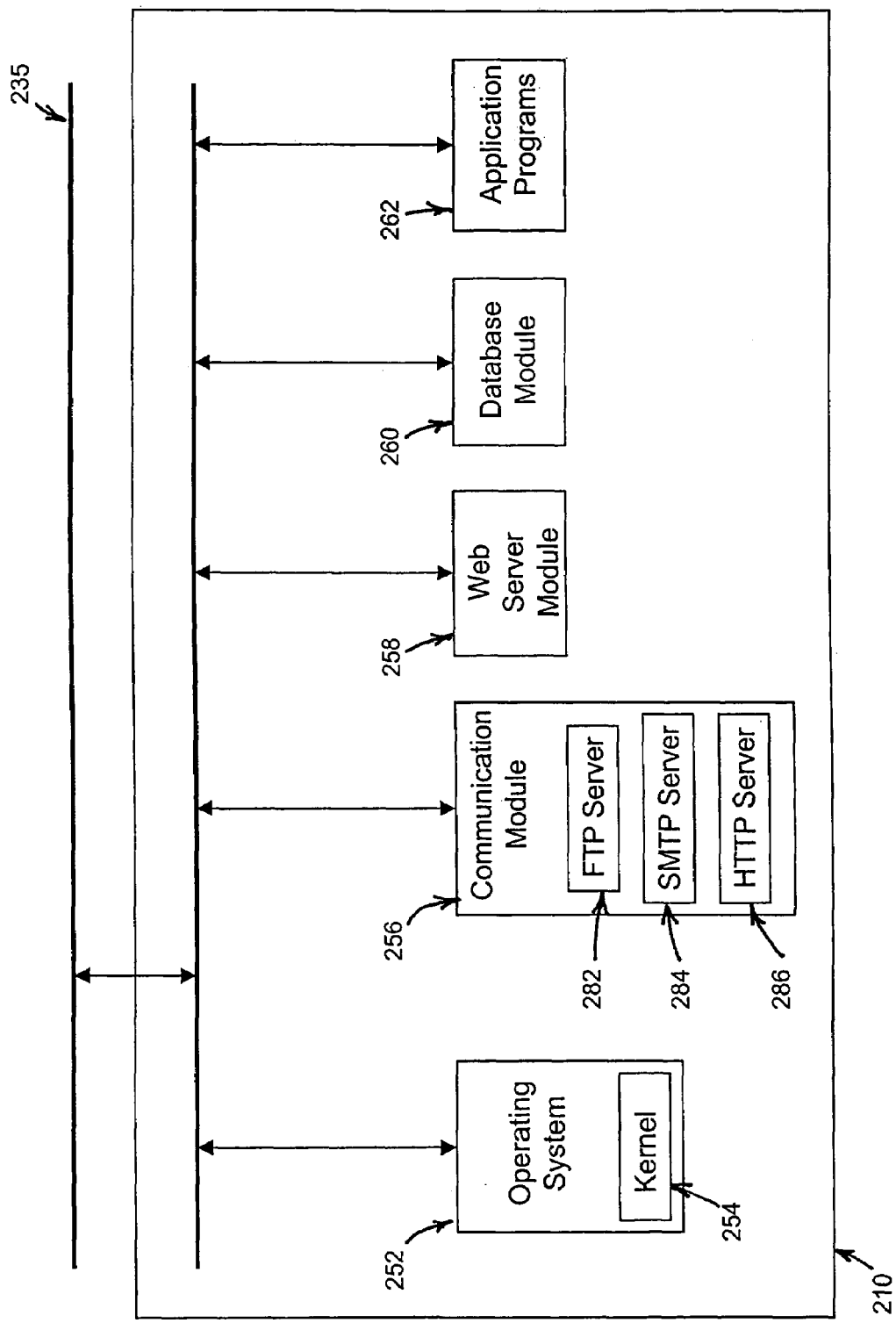
FIG. 2B is a block diagram illustrating a preferred embodiment of the memory associated with a CPU of the agricultural Web site computer system.

FIG. 2B is a block diagram illustrating a preferred embodiment of the memory 210 associated with a CPU 205 of the agricultural Web site computer system 130. The memory 210 includes modules of a software application for hosting an agricultural Web site. The software application and its modules may also be stored on another computer readable medium associated with the agricultural Web site computer system 130, such as compact disc read-only memory (CD-ROM) devices, tapes, or similar non-volatile devices.

The memory 210 is in communication with the communication bus 235, and preferably comprises an operating system 252, including a kernel 254, a communication module 256, a Web server module 258, a database administration module 260, and any desired application programs 262. The memory 210 is preferably a random access memory, but may also include read-only memory.

The operating system 252 preferably is WINDOWS NT®, but may be UNIX, DOS, MACINTOSH® Operating System, LINUX, SOLARIS®, or any other suitable operating system. The memory 210 also may include a variety of different application programs 272, including for example, word processing programs, spreadsheet programs, database programs, etc.

The communication module 256 facilitates communications between the agricultural Web site computer system 130 and one or more user computers 110 via network connection device 230 and the Internet 120. In that case, the communication module 266 preferably includes a File Transfer Protocol (FTP) proxy server 282, a Simple Mail Transfer Protocol (SMTP) proxy server 284, and a Hyper Text Transfer Protocol (HTTP) proxy server 286.

The Web server module 258 may host a plurality of Web pages and provide these Web pages to a Web browser resident on a user computer 110 via the HTTP proxy server 286.

The database administration module 260 preferably manages databases such as a pest database, a plant database, a state-by-state pesticide product database, a fertilizer product database, a seed product database, etc. at the agricultural Web site. The databases may be stored in the mass data storage device 215 and/or the memory 210.

Figure 3B:
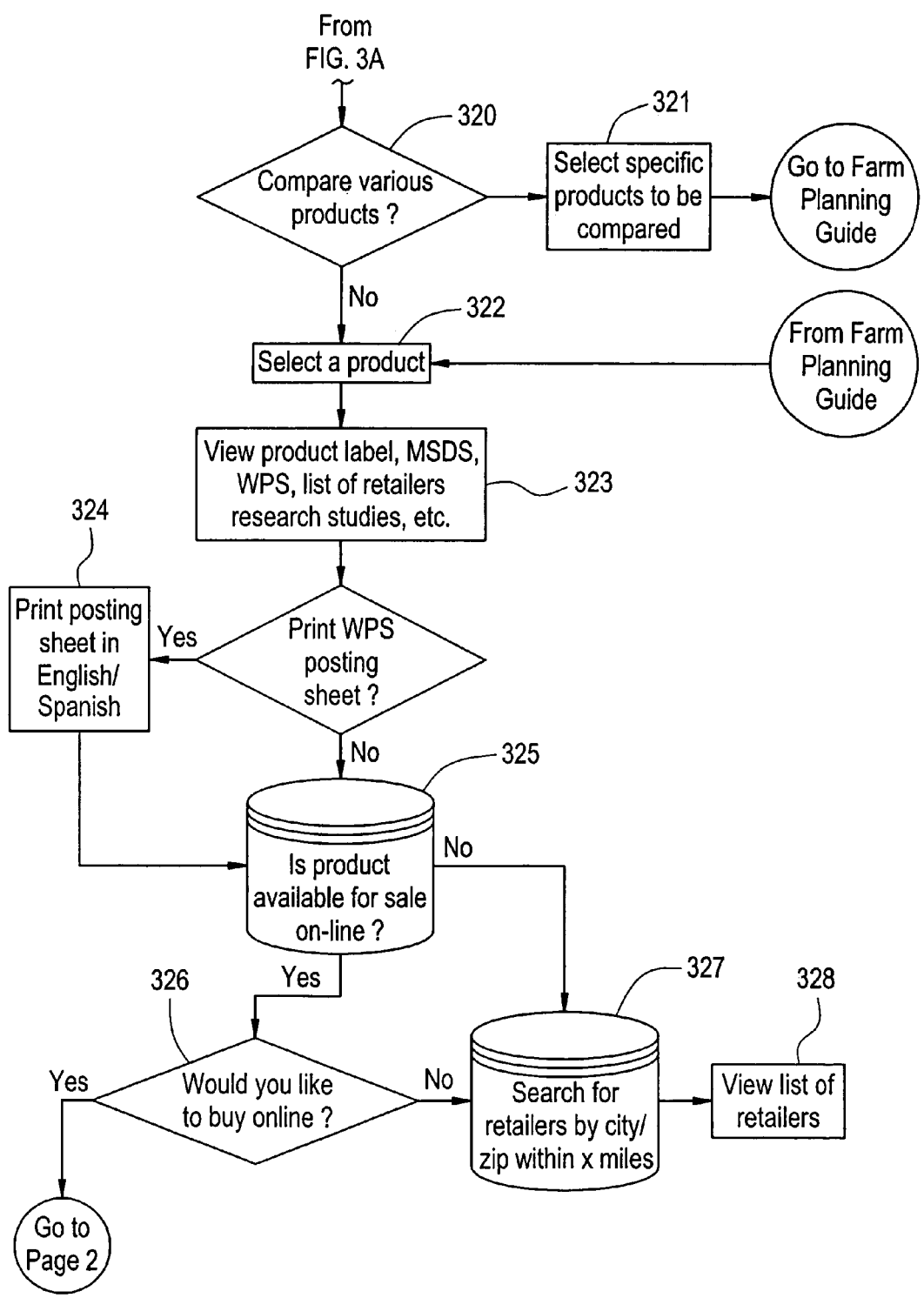

A portion of a flowchart 300 of a first preferred embodiment of a system and method of providing automated agricultural pesticide advice is illustrated in FIGS. 3A and 3B. The flowchart 300 particularly applies to an embodiment for providing automated agricultural pesticide advice via an Internet agricultural Web site. In that case, in a step 301, a user accesses the method and system by establishing an Internet connection between a Web browser on the user's computer and the agricultural Web site.

In a step 302, the user enters information regarding his/her name, and locational information, such as an address, city, county, state, and zip code, global positioning system (GPS) coordinates, and/or other geographical region as desired by a particular state wherein the user resides. If the user is a new user, he/she may choose to register his/her pertinent information so that it may be accessed by the agricultural Web site at later times. The agricultural Web site may determine that the user has not been authenticated, and transmit a "Registration" Web page to the user. Preferably, the Registration page includes information about the agricultural Web site's professional agricultural advice service and a hypertext "Registration" button for the user to click to start a registration process.

When the user selects the registration process, then the agricultural Web site transmits to the user a "Registration Info" Web page for the user to enter pertinent registration information, such as a name, password, e-mail address, etc. Preferably, the registration information may be obtained over a secure Web connection, in which case the user may also provide credit card and shipping information for any products which the user may order through the agricultural Web site. After entering the registration information, the user submits the information to the agricultural Web site, for example by clicking on a hypertext button on the "Registration Info" Web page.

Alternatively, in a step 303, the agricultural Web site queries the user's computer or other Web access device to check for a state "cookie" indicating the state or other geographical region in which the user's property is located. Alternatively, a "zip code" cookie or "county" cookie may be used. If the cookie is found, then the process proceeds to the step 307 as described below. If no cookie is found, then in a step 304, the user is queried for the state in which the user's property is located. Then a state cookie is set and sent to the user's computer in a step 305. Knowledge of the state in which a property is located is important because, for example, pesticides may be approved for use only in some states and may be approved for only certain uses in states where the pesticides are approved. These may include restricted use products (RUPs) and state limited use products (SLUPs).

In a step 306, the agricultural Web site queries the user's computer or other Web access device to check for a user cookie indicating the identity of the user. If the user cookie is found, then the user is authenticated by the agricultural Web site and previously entered information regarding the user and his/her property is retrieved from a user database at the agricultural Web site. If no user cookie is found, then the user is not authenticated and no information is available to the agricultural Web site regarding the user or any property.

Then an agricultural Web site home Web page is transmitted to the user. From the home Web page, a user may click on a "Find a Pesticide" button or otherwise select a hyperlink to execute a process for selecting a pesticide product.

In that case, in a step 307, the agricultural Web site then transmits a "Find a Pesticide" Web page to the user. From the "Find a Pesticide" Web page, the user first needs to identify a pest of interest. At the start, the "Find a Pesticide" Web page allows a user to either select a pest from an alphabetical list in step 308, or to specify in step 309 a pest category, such as: moths, beetles, etc. After the user selects a pest category, then the "Find a Pesticide" Web page presents the user with a list of pests within the selected category.

After the user is presented with the list of pests, the user may in a step 311 view a picture of each pest by clicking a "View It" button associated with the pest so that the user may confirm which particular pest they are interested in controlling.

After identifying a pest of interest, the user then needs to identify a plant or crop of interest. The "Find a Pesticide" Web page allows a user to either select a crop from an alphabetical list in step 313, or to specify in step 314 a plant category, such as: broadleaf, narrow-leaf, etc. After selecting a plant category, then the agricultural Web site presents the user with a list of plants within the selected category.

After the user is presented with the list of plants, in a step 317 the user may view a picture of each plant by clicking a "View It" button associated with the plant so that the user may confirm which particular plant they are interested in.

In a step 318 a database search is performed to find products which can be used to combat the chosen pest on the chosen plant/crop, which are also registered in the user's state.

In a step 320, the agricultural Web site then transmits a "Compare Products?" Web page to the user's computer, whereby the user either can select a product, or in a step 321 can select specific products to be compared. When the user chooses the latter option, he/she then enters a "Farm Planning Guide" process 500.

The "Farm Planning Guide" process 500 allows the user, such as a farmer, to enter particular information about crops which are to be grown, in order to obtain information and advice to optimize crop yield, for example, to maximize profits or minimize losses. In a step 501 the user may view application rates for the various products identified in step 321. The user then in a step 502 enters "mandatory inputs" which identify the materials currently used by the user to grow the crop, as well as current prices and yields for the crops in the absence of additional products which may be suggested by the "Farm Planning Guide." As appropriate, the user may enter additional information such as the cost of land, fuel prices, etc.

In a preferred embodiment, the agricultural Web site may automatically link to and track current crop prices, for example, from the Chicago Board of Trade or other commodities pricing entities. Also, the agricultural Web site preferably maintains information on the current prices of various pesticide products and other products which it recommends.

Based on the user inputs and other data, a processor at the agricultural Web site determines an optimal list of products for maximizing profits (or minimizing losses) for the user's property.

A "Planning Guide Results" page is then transmitted to the user in a step 503, and the user views these results in a step 504 to ascertain the optimal products.

The user is then given an opportunity in step 505 to obtain information as to seed selection. If the user indicates a desire for such information, then he/she is prompted to select seed selection criteria (i.e., flat vs. round, small/medium/large) in step 506. This information is then added to the mandatory inputs of step 502, and the process proceeds as above.

At this point the user may change various mandatory inputs to create "what-if" scenarios. This allows a user to ascertain how various factors effect the determination of the optimum product(s) to be applied to the user's crop(s), together with the best application rate(s).

If the user chooses not to use the seed selection guide, or after the user has done so, in a step 507 the user will be prompted to request fertilizer recommendations. If the user chooses to obtain such information, he/she is prompted to enter soil analysis information in step 508, which is then added to the mandatory inputs of step 502, and the process proceeds as above. Also, in that case, a proper type of fertilizer may be suggested or customized.

Moreover, at this point the user may change various mandatory inputs to create "what-if" scenarios. This allows a user to ascertain how various factors effect the determination of the optimum product(s) to be applied to the user's crop(s), together with the best application rate(s).

After the user responds to the prompt to request fertilizer information, he/she is given an opportunity to change the inputs of step 502, and the user can then repeat the "Farm Planning Guide" process, or may return to the process 300.

Upon re-entry into the process 300, the user selects a product in step 322. In a step 323, the user is prompted to view specific product information, such as the state-in-commerce specific product label, the MSDS, the WPS, a list of retailers, research studies, etc. The user may choose to print the WPS posting sheet in a step 324, and if so chosen, the posting sheet can be provided in English or Spanish.

In a step 325, it may be determined whether the product is available for sale on-line. If the product is available for sale on-line, then in a step 326, the user is asked whether he/she wants to buy the product on line.

If the product is not available for sale on-line, or if the user does not want to buy the product on-line, then in a step 327 the agricultural Web site computer system 130 searches a database for dealers/retailers within a predetermined radius of the user's location, which may be determined by zip code, street address, global positioning system (GPS) coordinates, etc.

Then, in a step 328, the agricultural Web site computer system 130 transmits to the user computer 110 a list of local dealers/retailers.

Figure 4:
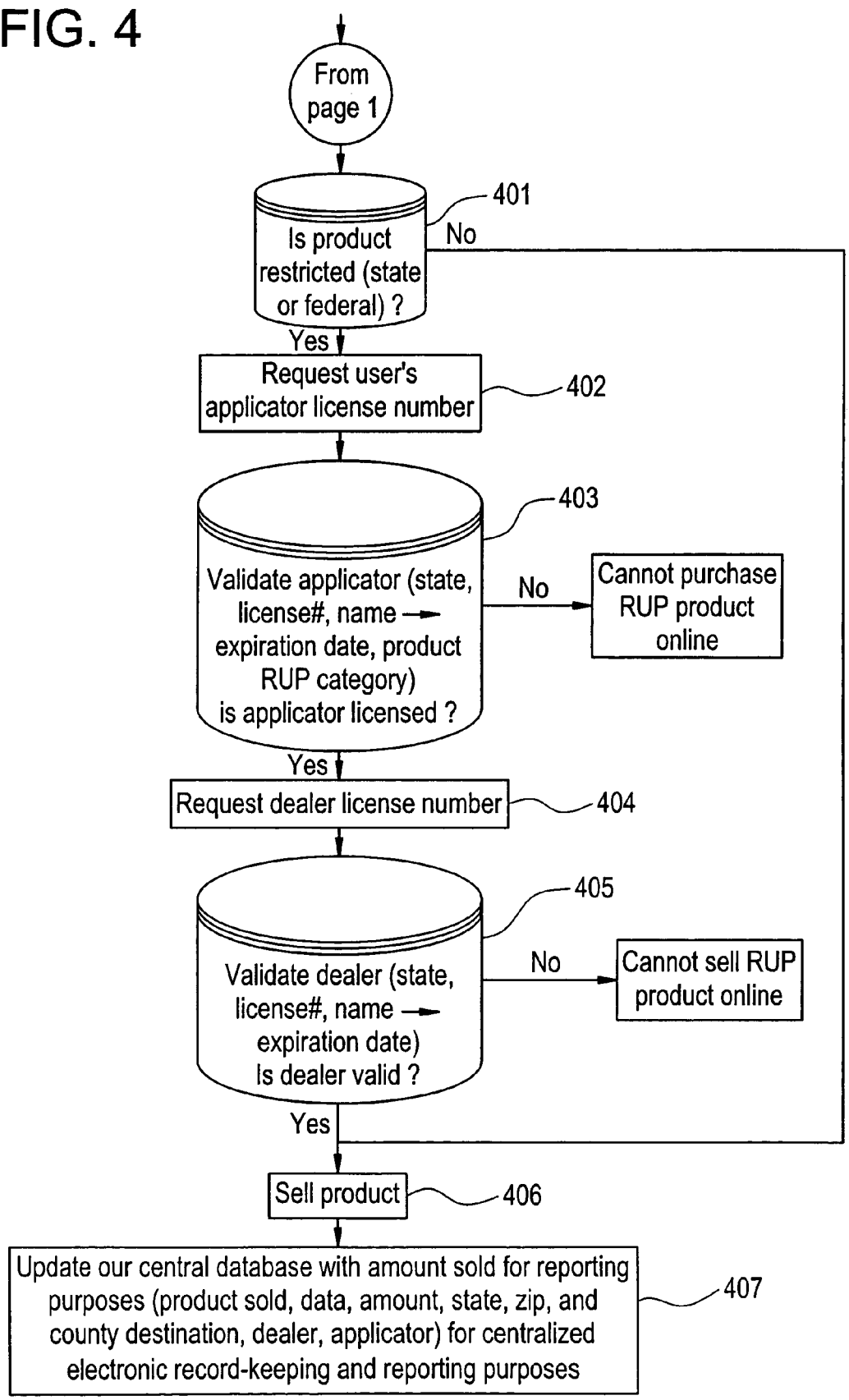
FIG. 4 is a second portion of a flowchart of a first preferred embodiment of a method and system for supplying agricultural pesticide information and/or advice.
Figure 5:
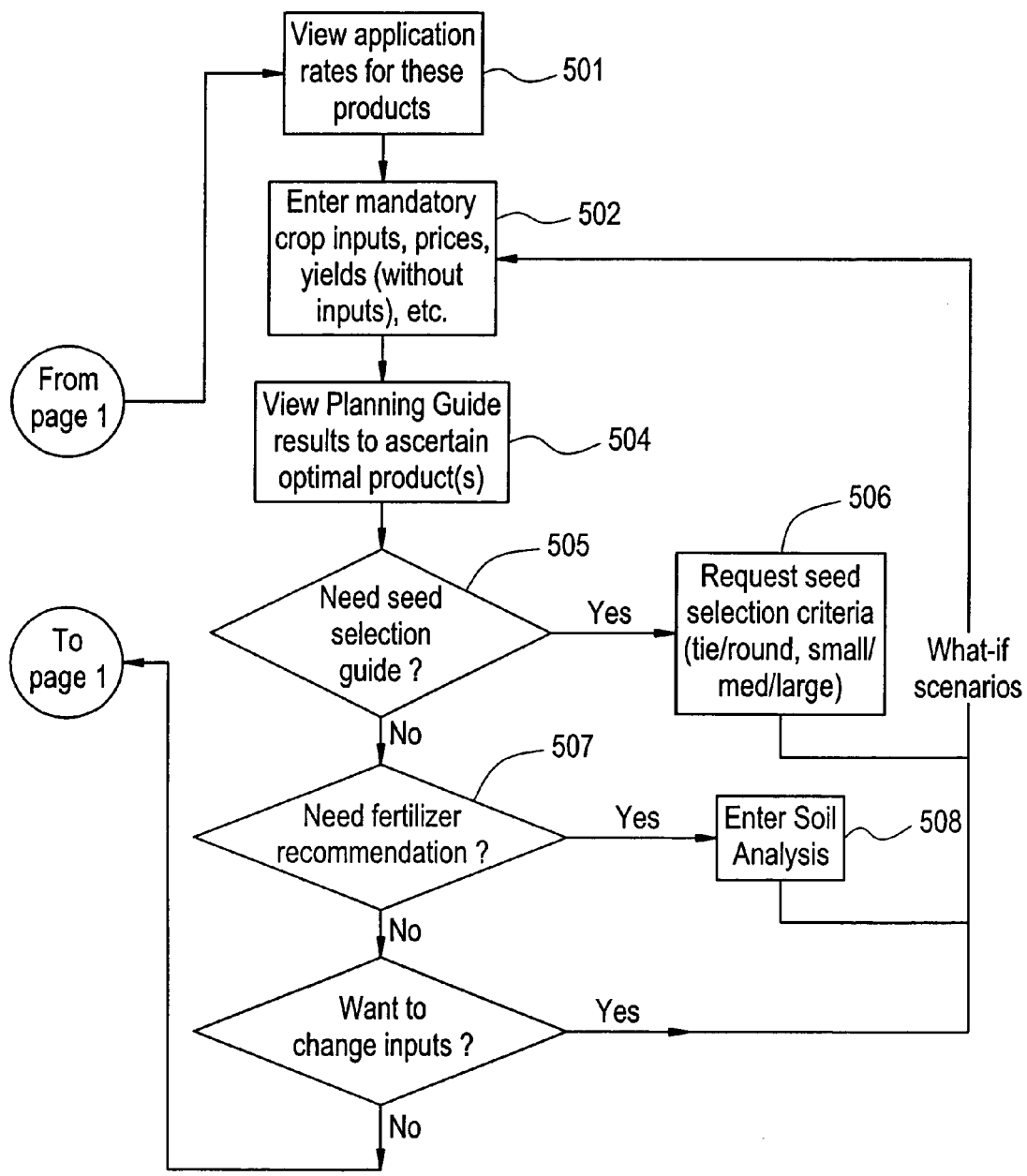
FIG. 5 is a third portion of a flowchart of a first preferred embodiment of a method and system for supplying agricultural pesticide information and/or advice.

If the user chooses to buy the product on-line in the step 326, he/she proceeds to the process 400, shown in FIG. 4.

In a step 401, it is determined by the agricultural Web site computer system 130 whether the product is restricted under federal and/or state law, specifically for the state in which the user resides and where the product is to be delivered and used. If the product is unrestricted, the user may buy the product on-line in a step 406. The database is then updated in a step 407 with information regarding the product, the date of the sale, the amount of product sold, the state, zip code, and county of destination, as well as the seller/dealer and the buyer/applicator.

If the product is restricted, the user is prompted in a step 402 to provide applicator license information. Applicator license information may comprise the name of a licensed applicator, the state in which he/she is licensed, the applicator license number and expiration date, the restricted use product (RUP) category(s) for which the applicator is licensed, etc. In a step 403, the applicator license information is validated.

In some cases, depending upon a state where the user is going to apply the product, the user may be required by state law to obtain an application permit before a specific application of an RUP, S-RUP, or SLUP product. Based upon the user's locational information supplied in the step 302 (e.g., the user's state), the agricultural Web site computer system 130 may determine whether or not an application permit is required. If it is determined that an application permit is required, in the step 402, the user is also prompted to enter an application permit identification code or an application permit number for the product which is being purchased.

In the preferred embodiment, the agricultural Web site automates the applicator license (and application permit) verification process by remotely accessing a state applicator license database for the state where the buyer/applicator is registered, and possibly a state application permit database. The state applicator license database has a plurality of data entries each comprising applicator license data (e.g., the name of a licensed applicator, the applicator's license number and expiration date, the restricted use product (RUP) category(s) for which the applicator is licensed, etc.). Preferably, the state applicator license database may be accessed by the agricultural Web site remotely via the Internet, although direct dial-up access is also possible. Alternatively, the state applicator license database may be stored at the agricultural Web site computer system 130. Also, where the state requires an application permit, the application permit may be validated from a state application permit database, or it may be recorded and later transmitted to the appropriate state agency for subsequent manual verification.

If the Buyer/Applicator is not licensed in the state where the product is being purchased, then the product cannot be purchased on-line. In that case, the process stops.

If the Buyer/Applicator is licensed for the appropriate RUP category in the state where the product is being purchased, then the process continues as described below.

The process 400 may be separately operated from the processes 300 and 500, for example by a separate pesticide sales Web site, or an auction Web site. The Web site may match pesticide sellers/dealers with excess pesticide inventory to sell, with pesticide buyers looking to purchase pesticide products. In that case, in a step 404 the Web site obtains the seller/dealer's name and license number. This may be obtained from a database of Web site computer system wherein it was earlier stored. For example, a seller/dealer may supply this information when he/she registers to sell products via the Web site, or when the seller/dealer offers the pesticide product for sale via the Web site.

In a step 405, the information regarding the seller/dealer (the dealer's name, the state(s) in which he/she is licensed, and the license number(s) and expiration date(s)) is validated.

In the preferred embodiment, the Web site automates the dealer license verification process by remotely accessing a state dealer license database for the state where the buyer/applicator is to receive the product. The state dealer license database has a plurality of data entries each comprising dealer license data (e.g., the name of a licensed dealer, the dealer's license number and expiration date, etc.). Preferably, the state dealer license database may be accessed by the Web site remotely via the Internet, although direct dial-up access is also possible. Alternatively, the state applicator license database may be stored at the Web site performing the sales transaction.

If the seller/dealer is not licensed in the state where the product is to be sold, then the product cannot be purchased on-line. If the seller/dealer is licensed to sell the product in a state where the buyer/applicator resides, then the product can be sold in the step 406, preferably via hyperlinks on the "Product List" Web page, and a central pesticide sales database of the Web site computer system is then updated in the step 407.

Preferably, during the sales step 406, a user specifies a delivery address where the product is to be delivered or shipped. In the preferred embodiment, the state which the user specifies for delivery is compared with a state which the user provided in the step 302 and which is checked to determine whether the user is licensed to purchase and apply the product. This insures that the product is only sold to and delivered to a licensed party, and prevent fraud.

In another preferred embodiment, the agricultural Web site will not even display a product to the buyer/applicator if the seller/dealer is not licensed to sell the product in a state where the buyer/applicator resides, or if the buyer/applicator does not have the proper license and, where required, permit, or if the product is not registered for sale in the buyer's state. In that case, the steps 401 through 405 may be performed as part of the step 325 shown in FIG. 3B.

While the invention has been described and illustrated herein by references to various specific materials, procedures and examples, it is understood that the invention is not restricted to the particular material combinations of material, and procedures selected for that purpose. Numerous variations of such details can be implied as will be appreciated by those skilled in the art.

What is claimed is:

1. A method of providing agricultural pesticides, comprising:
   a. inputting into a computer
      1. the identity of a pest existing on a property;
      2. the identity of a plant or crop existing on the property, wherein said plant or crop is adversely affected by said pest;
      3. the location of the property;
   b. at a computer, executing an algorithm for generating therefrom instructions for choosing a pesticide registered in said location to protect said plant or crop from said pest;
   c. obtaining the pesticide by sale on-line, wherein the algorithm initiates an analysis of restrictions on the sale of the pesticide; and
   d. providing the pesticide.

2. The method of claim 1, wherein the instructions allow for a comparison of different pesticides.

3. The method of claim 1, wherein the instructions provide access to one or more of the following: a product label, a material safety data sheet, a worker protection statement, and a list of retailers.

4. The method of claim 1, wherein the analysis includes validating information regarding a pesticide applicator.

5. The method of claim 1, wherein the analysis includes validating information regarding a pesticide dealer.

6. The method of claim 1, wherein information regarding an on-line sale of the pesticide is entered into a central database.

7. The method of claim 1, further comprising accessing a farm planning guide.

8. The method of claim 7, wherein the farm planning guide provides information to assist a user in optimizing crop yield.

9. The method of claim 7, wherein the farm planning guide provides information regarding seeds.

10. The method of claim 7, wherein the farm planning guide provides information regarding fertilizers.

11. A method of providing agricultural pesticides, comprising:
   determining a geographical region in which a user's property is located;
   receiving, into a computer from the user, the identity of a pest existing on the property;
   receiving, into the computer from the user, the identity of a plant/crop existing on the property, wherein the plant or crop is adversely affected by the pest;
   at a compute, executing an algorithm for generating instructions for choosing a pesticide registered in the geographical region to protect the plant/crop from the pest by using the geographical region, the pest identity, and the plant/crop identity;
   obtaining the pesticide by sale on-line, wherein the algorithm initiates an analysis of restrictions on the sale of the pesticide; and
   providing the pesticide.

12. A system for providing agricultural pesticide information, the system comprising:
   a. memory for storing:
      1. a plant database;
      2. a pest database;
      3. a pesticide database;
      4. a location database;
   b. a processor; and
   c. computer readable code stored in memory and executable by the processor to cause the processor to generate instructions regarding which pesticides in the pesticide database are registered for use in a location within the location database and can be used to protect a plant in the plant database from a pest in the pest database, wherein the pesticide database contains information on restrictions on the pesticides.

13. The system of claim 12, wherein the memory further stores a database of licensed applications for the restricted pesticides.

14. The system of claim 12, wherein the memory further stores a database of licensed dealers who may sell the restricted pesticides.

15. The system of claim 12, wherein the memory further stores a farm planning guide database.

16. The system of claim 15, wherein the farm planning guide database includes a seed database.

17. The system of claim 15, wherein the farm planning guide database includes a fertilizer database.

* * * * *